United States Patent
Chen

(10) Patent No.: US 7,542,299 B2
(45) Date of Patent: *Jun. 2, 2009

(54) KEYBOARD, VIDEO AND MOUSE (KVM) SWITCH

(75) Inventor: Kevin Chen, Taipei Hsien (TW)

(73) Assignee: Aten International Co., Ltd, Shijr City (TW)

( * ) Notice: Subject to any disclaimer, the term of this patent is extended or adjusted under 35 U.S.C. 154(b) by 410 days.

This patent is subject to a terminal disclaimer.

(21) Appl. No.: 11/317,632

(22) Filed: Dec. 22, 2005

(65) Prior Publication Data

US 2006/0146491 A1   Jul. 6, 2006

Related U.S. Application Data

(63) Continuation-in-part of application No. 10/190,015, filed on Jul. 8, 2002, now Pat. No. 7,035,112.

(51) Int. Cl.
*H05K 5/00* (2006.01)

(52) U.S. Cl. .................. 361/752; 361/790; 361/800

(58) Field of Classification Search ............. 361/752, 361/797, 800, 714, 795; 439/606, 736, 502, 439/505, 654, 264; 312/223
See application file for complete search history.

(56) References Cited

U.S. PATENT DOCUMENTS

| 2,667,553 | A | 1/1954 | Moorhead et al. |
|---|---|---|---|
| 2,870,287 | A | 1/1959 | Corbitt et al. |
| 4,103,252 | A | 7/1978 | Bobick |
| 4,247,600 | A | 1/1981 | Adachi |
| 4,719,314 | A | 1/1988 | Nothnagel et al. |
| 4,927,787 | A | 5/1990 | Patel |
| 4,927,987 | A | 5/1990 | Kirchgessner |
| 5,192,226 | A | 3/1993 | Wang |
| 5,260,532 | A | 11/1993 | Tinder et al. |
| 5,708,897 | A | 1/1998 | Manabe et al. |
| 5,792,986 | A | 8/1998 | Lee |
| 5,823,352 | A | 10/1998 | Mena et al. |
| 6,133,527 | A | 10/2000 | Park et al. |
| 6,160,485 | A | 12/2000 | Krakovich |
| 6,329,616 | B1 | 12/2001 | Lee |
| 6,378,014 | B1 | 4/2002 | Shirley |
| 6,449,866 | B1 | 9/2002 | Murray |
| 6,498,890 | B1 | 12/2002 | Kimminau |
| 6,521,836 | B1 | 2/2003 | Simonazzi |

(Continued)

FOREIGN PATENT DOCUMENTS

JP         9-55155 A        2/1997

(Continued)

*Primary Examiner*—Hung S Bui
(74) *Attorney, Agent, or Firm*—Chen Yoshimura LLP

(57) ABSTRACT

A computer peripherals switch having a switching circuit contained within a body; a first computer cable electrically coupled to the switching circuit and integrally attached to the body; a second computer cable electrically coupled to the switching circuit and integrally attached to the body; a plurality of computer peripheral ports electrically coupled to the switching circuit and disposed on the body; wherein the first computer cable has a plurality of first computer connectors, each of which is matched to at least one of the ports in the plurality of computer peripheral ports, and wherein the switching circuit is configured to selectively couple the plurality of first computer connectors to the plurality of computer peripheral ports.

20 Claims, 9 Drawing Sheets

U.S. PATENT DOCUMENTS

| | | |
|---|---|---|
| 6,609,034 B1 | 8/2003 | Behrens et al. |
| 6,671,756 B1 | 12/2003 | Thomas et al. |
| 6,957,287 B2 | 10/2005 | Lou et al. |
| 7,035,112 B2 | 4/2006 | Chen |
| 7,047,331 B2 | 5/2006 | Dickens |
| 7,283,375 B2 | 10/2007 | Chen |
| 7,318,750 B1 | 1/2008 | Chacon et al. |
| 2001/0023141 A1 | 9/2001 | Chang |
| 2001/0053627 A1 | 12/2001 | Armistead et al. |
| 2003/0223185 A1 | 12/2003 | Doczy et al. |
| 2004/0222944 A1 | 11/2004 | Sivertsen |
| 2004/0257761 A1 | 12/2004 | Park |
| 2006/0146491 A1 | 7/2006 | Chen |
| 2007/0086173 A1 | 4/2007 | Chang et al. |
| 2007/0088876 A1 | 4/2007 | Chen |

FOREIGN PATENT DOCUMENTS

| | | |
|---|---|---|
| TW | 539145 | 6/2003 |

KEYBOARD, VIDEO AND MOUSE (KVM) SWITCH

CLAIM OF PRIORITY UNDER 35 U.S.C. §120

The present Application for Patent is a continuation-in-part of patent application Ser. No. 10/190,015 entitled "AUTOMATIC SWITCH," filed Jul. 8, 2002, now U.S. Pat. No. 7,035,112, and assigned to the assignee hereof and hereby expressly incorporated by reference herein.

BACKGROUND

1. Field

The present invention relates to an automatic switch for a user to automatically switch between two or more computers, and, more particularly, to an improved keyboard, video and mouse (KVM) switch that has integrally injection-molded cables to provide good weather-resistance, impact-resistance, and some protection of an internal circuit board thereof.

2. Background

Computers are becoming more prevalent in both homes and offices, and are often considered requisite "tools" for work, learning, leisure activities, and daily life. In certain environments, a user needs to be able to access to multiple computers simultaneously. For example, a user may have a computer dedicated to work, such as a computer used for stock trading; as well as a second computer limited to non-work activities, such as a computer used for browsing the World-Wide-Web and playing video games. Currently, for users who need to access two or more computers simultaneously, instead of using a separate keyboard, monitor and mouse for each computer, an automatic switching device commonly referred to as a Keyboard, Video and Mouse (KVM) switch is used. The KVM switch allows the user to use one keyboard, monitor and mouse to control two or more computers by being able to switch among them.

Typically, the KVM switch contains a circuit that provides the functionality for switching a set of keyboard, mouse and monitor among different computers. Thus, one set of signal cables are run from a keyboard (keyboard signal cable), a mouse (mouse signal cable) and a monitor (video signal cable) to the KVM switch, and, to each computer, another set of keyboard, mouse and monitor signals cables are run from the KVM switch. Thus, if the KVM switch is connected to 2 computers, 2 separate sets of cables, each set having a keyboard signal cable, a mouse signal cable, and a video signal cable, are needed. With the number of cables running from the KVM switch increasing incrementally based on the number of computers connected, cable management becomes a problem. Further, as the number of cables increases, the likelihood that the cables may become loose and disconnected from the KVM switch also increases. Another issue is the confusion on the part of the user of which cables to purchase because many KVM switches have multiple outlets for connecting to different types of peripherals.

SUMMARY OF THE PREFERRED EMBODIMENTS

In one preferred embodiment of the present invention, a keyboard, video and mouse (KVM) switch includes an enclosure, a switching circuit contained within the enclosure and a set of connector ports disposed on the enclosure and electrically coupled to the switching circuit. The KVM switch further includes a plurality of cables integrated into the enclosure and electrically coupled to the switching circuit, each cable in the plurality of cables including a plurality of connector plugs, wherein each connector plug in the plurality of connector plugs for one of the cables in the plurality of cables are matched to at least another one of the respective plurality of connector plugs from another one of the cables in the plurality of cables, and wherein the switching circuit is configured to operatively switch the set of connector ports to connect to one of the plurality of cables.

In another preferred embodiment of the present invention, a computer peripherals switch includes a switching circuit contained within a body and a first computer cable electrically coupled to the switching circuit and integrally attached to the body. The computer peripherals switch further includes a second computer cable electrically coupled to the switching circuit and integrally attached to the body and a plurality of computer peripheral ports electrically coupled to the switching circuit and disposed on the body; wherein the first computer cable has a plurality of first computer connectors, each of which is matched to at least one of the ports in the plurality of computer peripheral ports, and wherein the switching circuit is configured to selectively couple the plurality of first computer connectors to the plurality of computer peripheral ports.

Other objects, features and advantages will become apparent to those skilled in the art from the following detailed description. It is to be understood, however, that the detailed description and specific examples, while indicating exemplary embodiments, are given by way of illustration and not limitation. Many changes and modifications within the scope of the following description may be made without departing from the spirit thereof, and the description should be understood to include all such variations.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
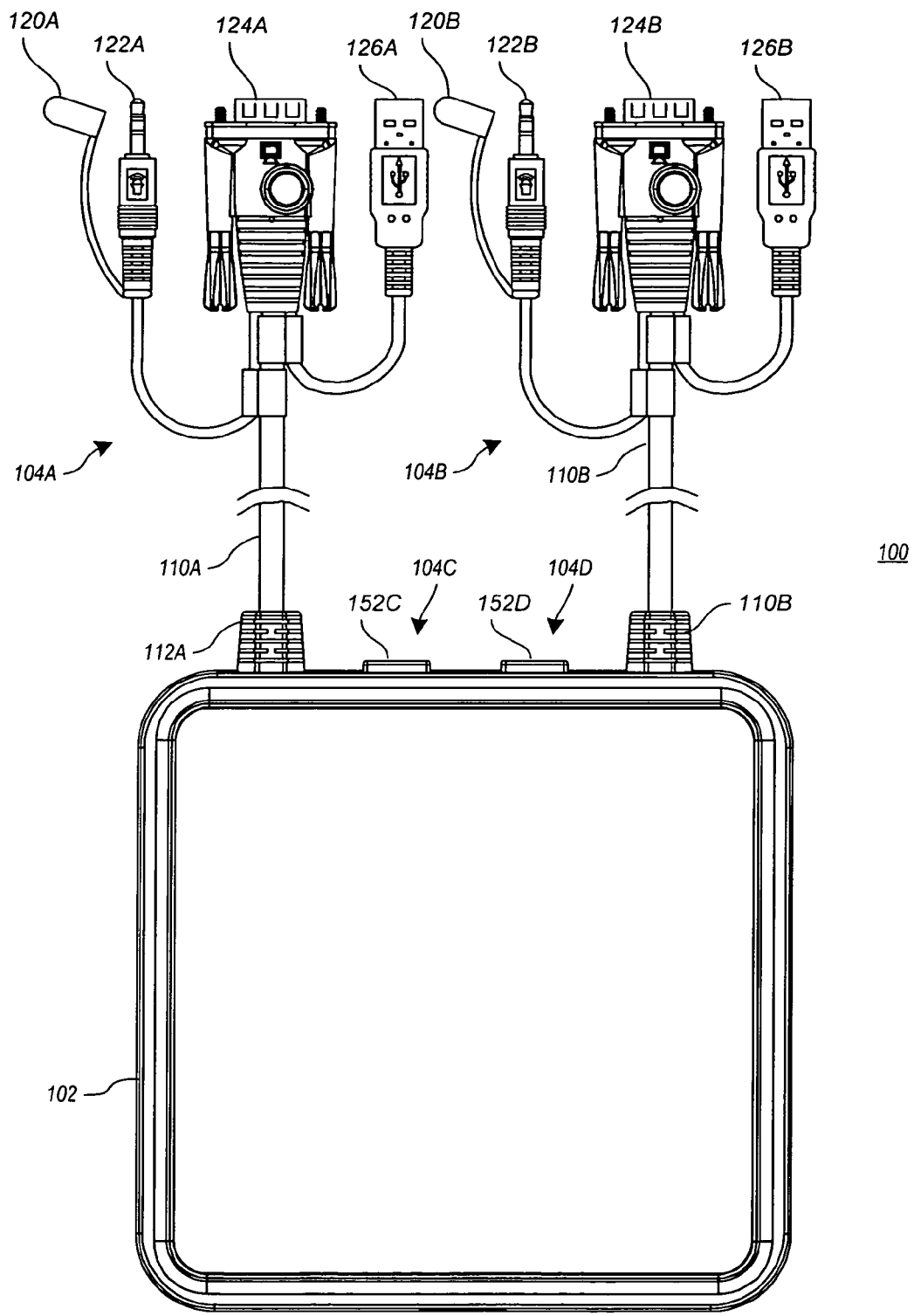
FIG. 1 is a top plan view of a keyboard, video and mouse (KVM) switch configured in accordance with one preferred embodiment of the present invention.
Figure 7:
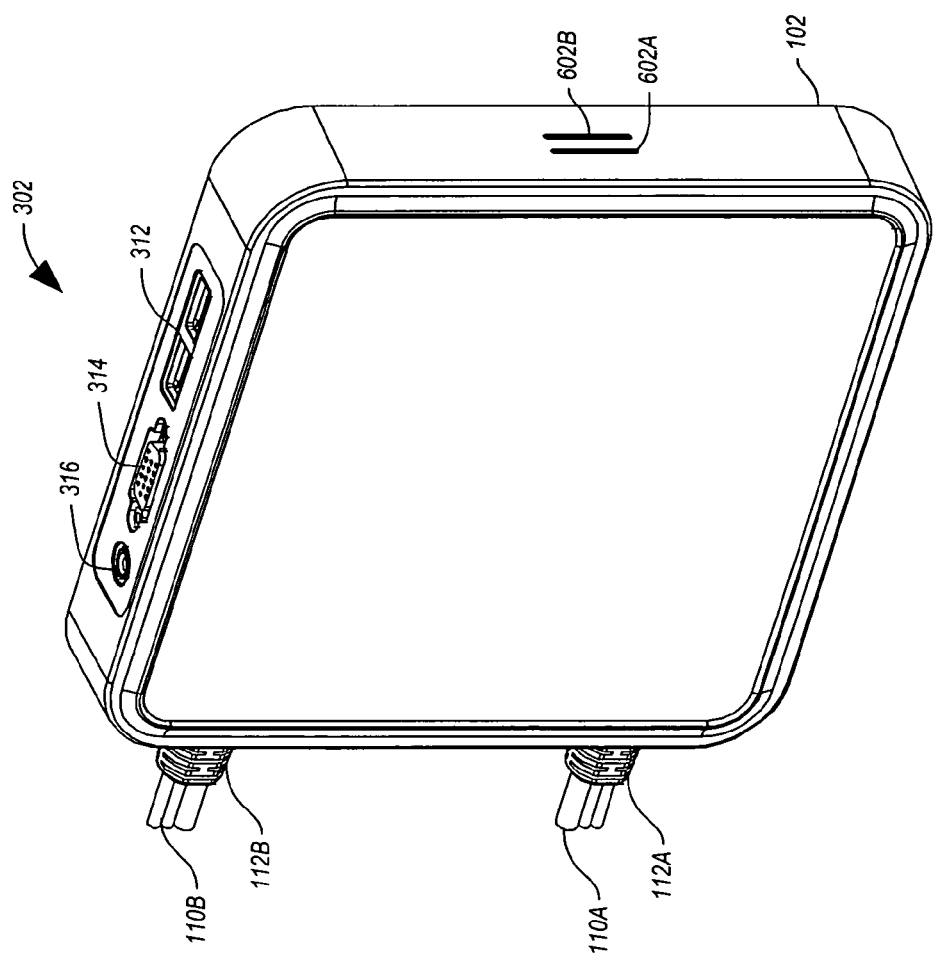
FIG. 7 is a top perspective view of the keyboard, video and mouse (KVM) switch of FIG. 1.
Figure 8:
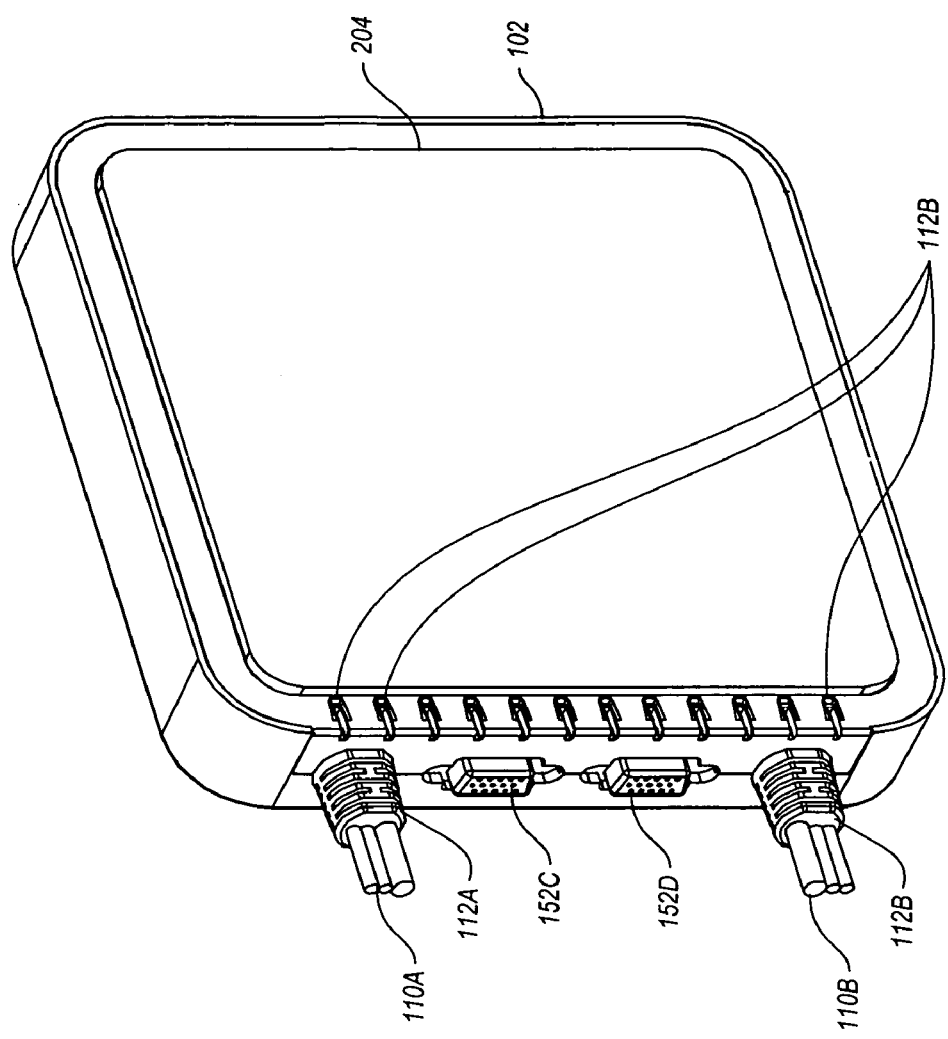
FIG. 8 is a bottom perspective view of the keyboard, video and mouse (KVM) switch of FIG. 1.

FIG. 1 illustrates a Keyboard, Video and Mouse (KVM) switch device 100 configured in accordance with one preferred embodiment of the present invention. During the description of FIG. 1 and the other figures, reference will also be made to FIG. 7, which is a perspective view of the top of KVM switch device 100, and FIG. 8, which is a perspective view of the bottom of KVM switch device 100. KVM switch device 100 includes a body 102, from which a first output 104A and a second output 104B extends. In one preferred embodiment, first output 104A and second output 104B includes a first cable 110A and a second cable 110B, respectively, integrated into body 102. Each cable is attached to body 102 via a strain relief. Thus, in one preferred embodiment, first cable 110A and second cable 110B are permanently attached to body 102 via a first strain relief 112A and a second strain relief 112B, respectively. In one preferred embodiment, first cable 110A and second cable 110B are integrally formed (e.g., molded) with body 102, such that the cables are sealed to the body. Extending from first cable 110A and second cable 110B are a first plurality of plugs and a second plurality of plugs, respectively, each having an audio plug (122A, 122B), with a cover plug (120A, 120B); a video plug (124A, 124B); and a peripheral plug (126A, 126B). In one preferred embodiment, each peripheral plug (126A, 126B) is compatible for mating with a Universal Serial Bus (USB) standard device as promulgated by the USB Implementers Forum, Inc. In other preferred embodiments, each peripheral plug is compatible for mating with other peripheral standards, such as the PS/2 connector standard as developed by IBM Corporation.

A third output 104C and a fourth output 104D are also located on body 102. In one preferred embodiment, third output 104C and fourth output 104D includes a first cable connector 152C and a second cable connector 152D, respectively, where each cable connector is configured to be connected to a detachable cable that contains a plurality of plugs such as audio plugs, video plugs, and peripheral plugs similar to the plugs on first cable 110A and second cable 110B. In another preferred embodiment, the detachable cable that may be connected to first cable connector 152C and/or second cable connector 152D may contain a different number of plugs as compared to first cable 110A or second cable 110B. For example, the detachable cable may only contain a video plug and one peripheral plug.

Figure 2:
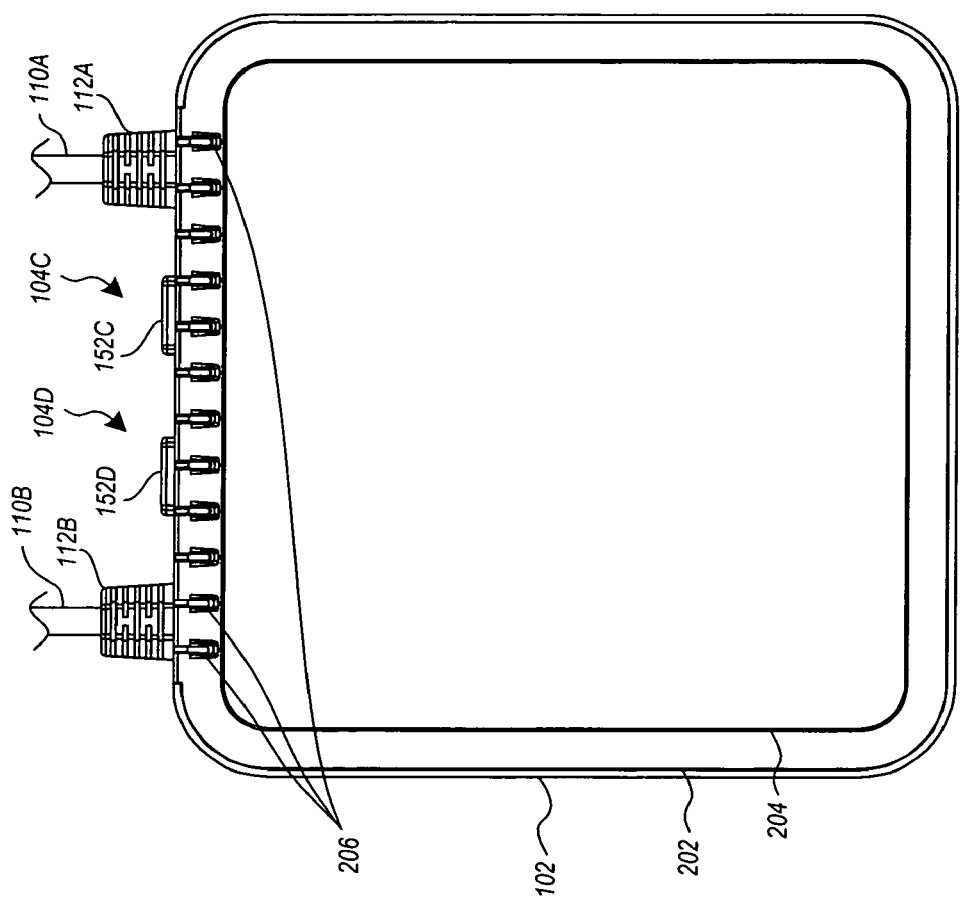
FIG. 2 is a bottom plan view of the keyboard, video and mouse (KVM) switch of FIG. 1.

FIG. 2 illustrates a bottom plan view of KVM switch device 100 having a bottom side 202 includes a padding 204 and a plurality of vent slots 206. In one preferred embodiment, padding 204 is comprised of a material that provides for non-slip capabilities. In one preferred embodiment, materials that may be used include rubber-based compounds or polymers. For example, a rubber pad may be used. In another preferred embodiment, material such as cloth may be used.

Figure 3:
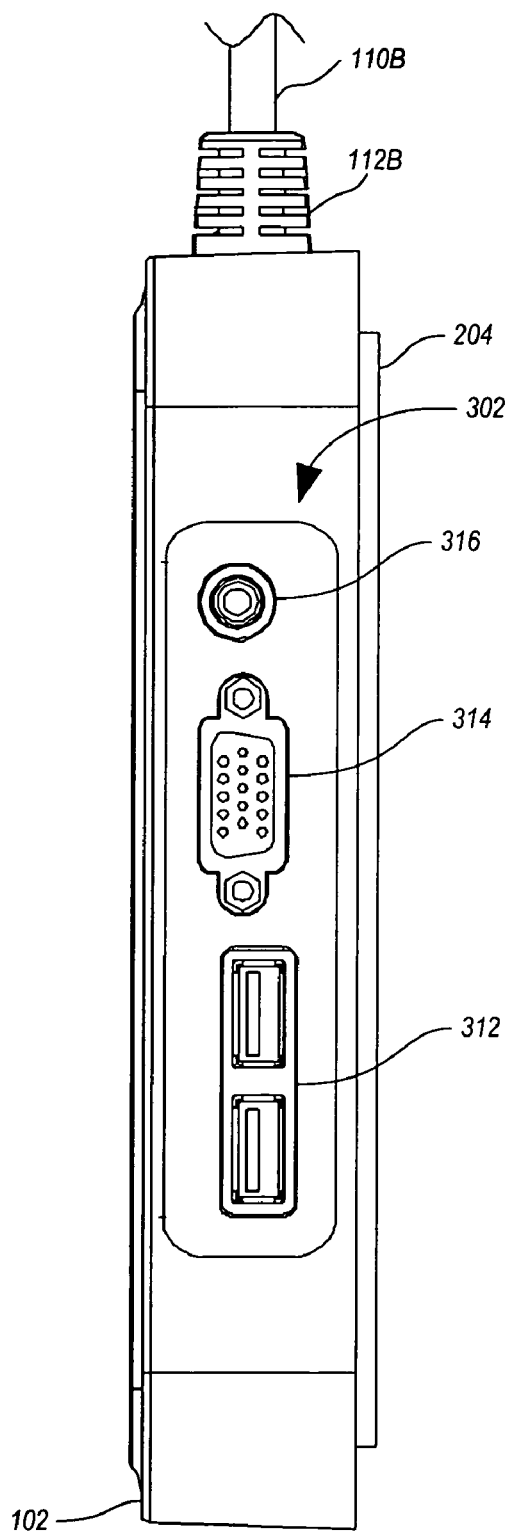
FIG. 3 is a right elevation view of the keyboard, video and mouse (KVM) switch of FIG. 1.
Figure 5:
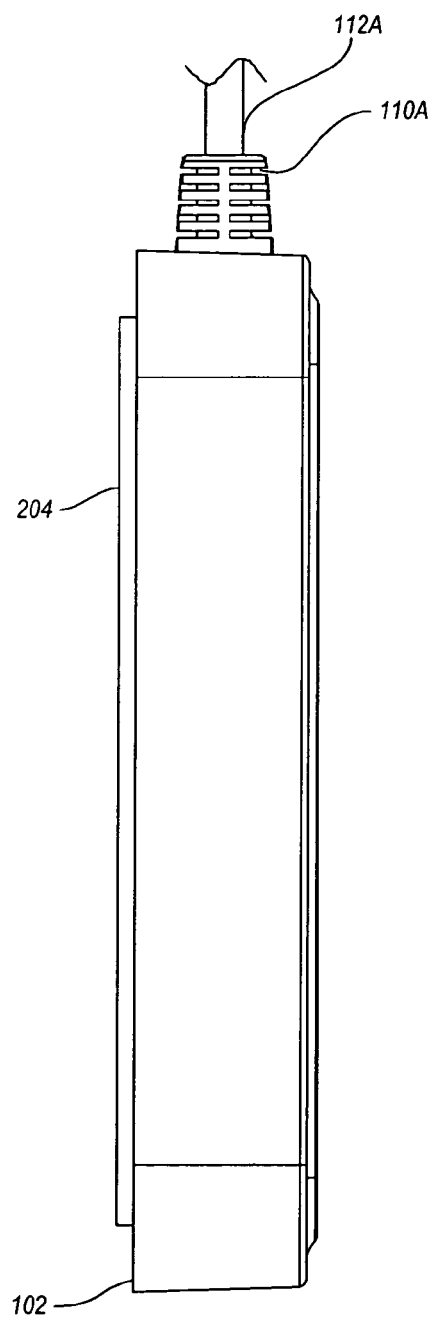
FIG. 5 is a left elevation view of the keyboard, video and mouse (KVM) switch of FIG. 1.

FIG. 3 illustrates a view of the right side of KVM switch device 100 having a plurality of computer peripheral ports 302 including a pair of peripheral ports 312, a video port 314, and an audio port 316. In one preferred embodiment, pair of peripheral ports 312 is similar to peripheral plug (126A, 126B), such that the computer peripheral communication standard with which pair of peripheral ports 312 is compatible is the same standard with which peripheral plug (126A, 126B) is compatible. For example, pair of peripheral ports 312 and peripheral plug (126A, 126B) are compatible with the USB standard. In another preferred embodiment, pair of peripheral ports 312 and peripheral plug (126A, 126B) are compatible with different computer peripheral interconnection standards and KVM switch device 100 needs to perform certain translations of the signals going to and from the computer peripherals coupled to the plug/ports, as further discussed below. FIG. 5 is a view of the left side of KVM switch device 100.

Figure 4:
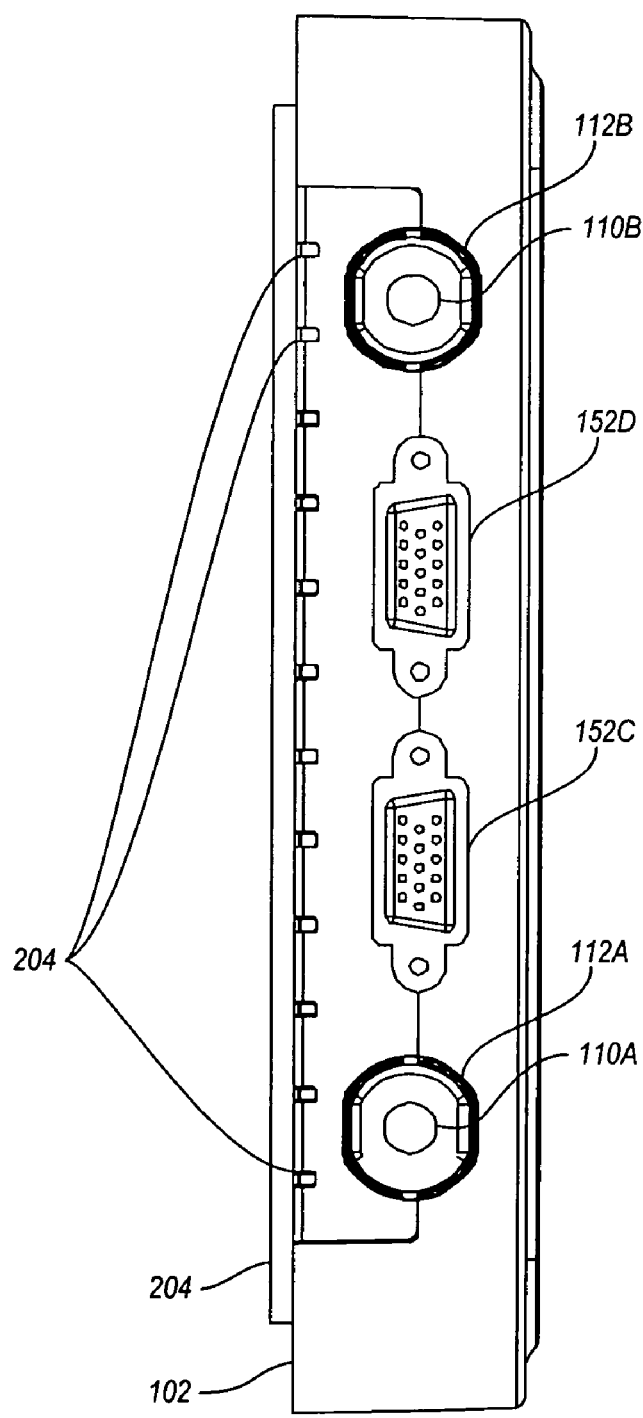
FIG. 4 is a rear elevation view of the keyboard, video and mouse (KVM) switch of FIG. 1.

FIG. 4 is a rear elevation view of illustrating how first cable 10A, second cable 110B, first cable connector 152C and second cable connector 152D are integrated into body 102 and how plurality of vent slots 206 is configured to allow the interior of KVM switch device 100 to ventilate with the surrounding environment. In one preferred embodiment, the electronics internal to KVM switch device 100 are protected from moisture, and any liquid that may accidentally reach the interior will not affect the electronics because they are so sealed.

Figure 6:
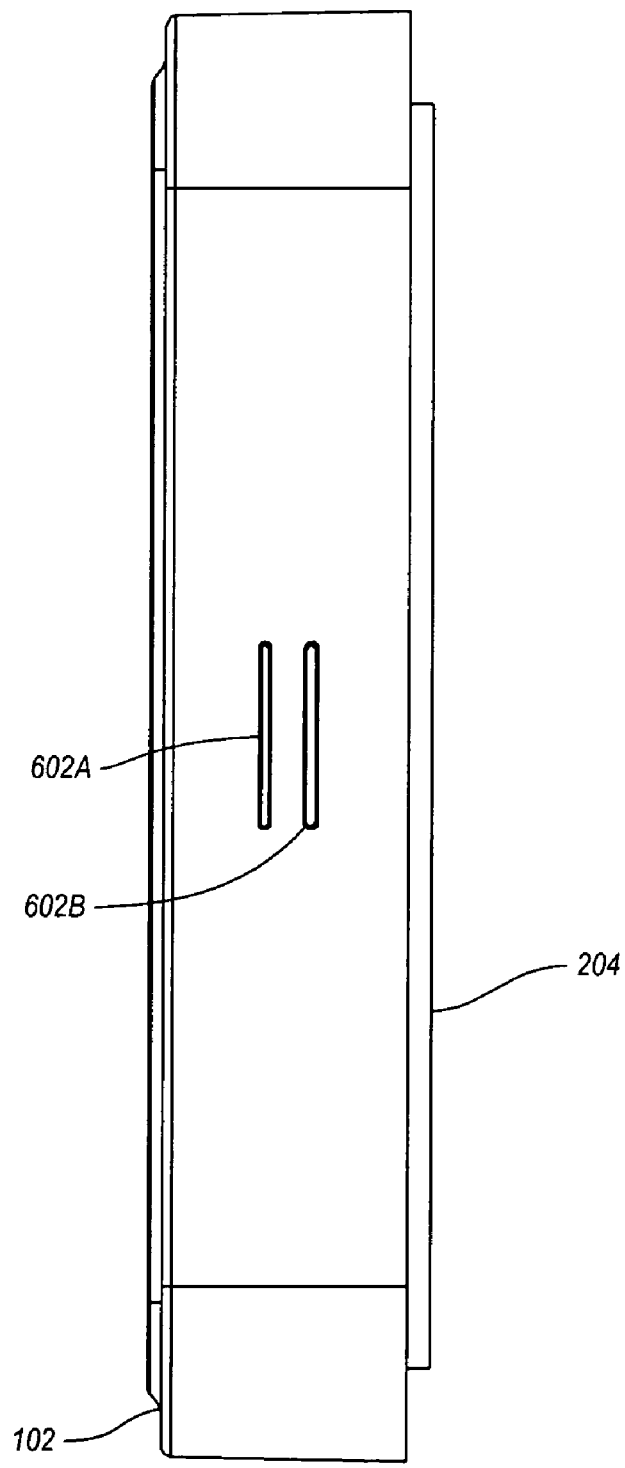
FIG. 6 is a front elevation view of the keyboard, video and mouse (KVM) switch of FIG. 1.

FIG. 6 is a view of the front of KVM switch device 100, where a pair of indicator lights 602A and 602B indicate the status of KVM switch device 100. Body 102 contains a switching circuit (not shown) that switches the signals received from plurality of computer peripheral ports 302 to couple them to one or more of the set of outputs 104A-104D. In one preferred embodiment, each of the indicator lights indicates the operational status of one of the computers that is connected to KVM switch device 100. For example, indicator light 602A may be lit to indicate that KVM switch device 100 is operating to electrically couple the signals received from plurality of computer peripheral ports 302 to first output 104A. Indicator light 602B can be lit to indicate if KVM switch device 100 is operating to electrically couple the signals received from plurality of computer peripheral ports 302 to second output 104B. In another preferred embodiment, the indicator lights may signal that KVM switch device 100 is operating to electrically couple the signals received from plurality of computer peripheral ports 302 to third output 104C or fourth output 104D. In yet another preferred embodiment, the indicator lights may indicate the coupling of the signals from plurality of computer peripheral ports 302 to any of the outputs through a series or sequence of light flashes.

Figure 9:
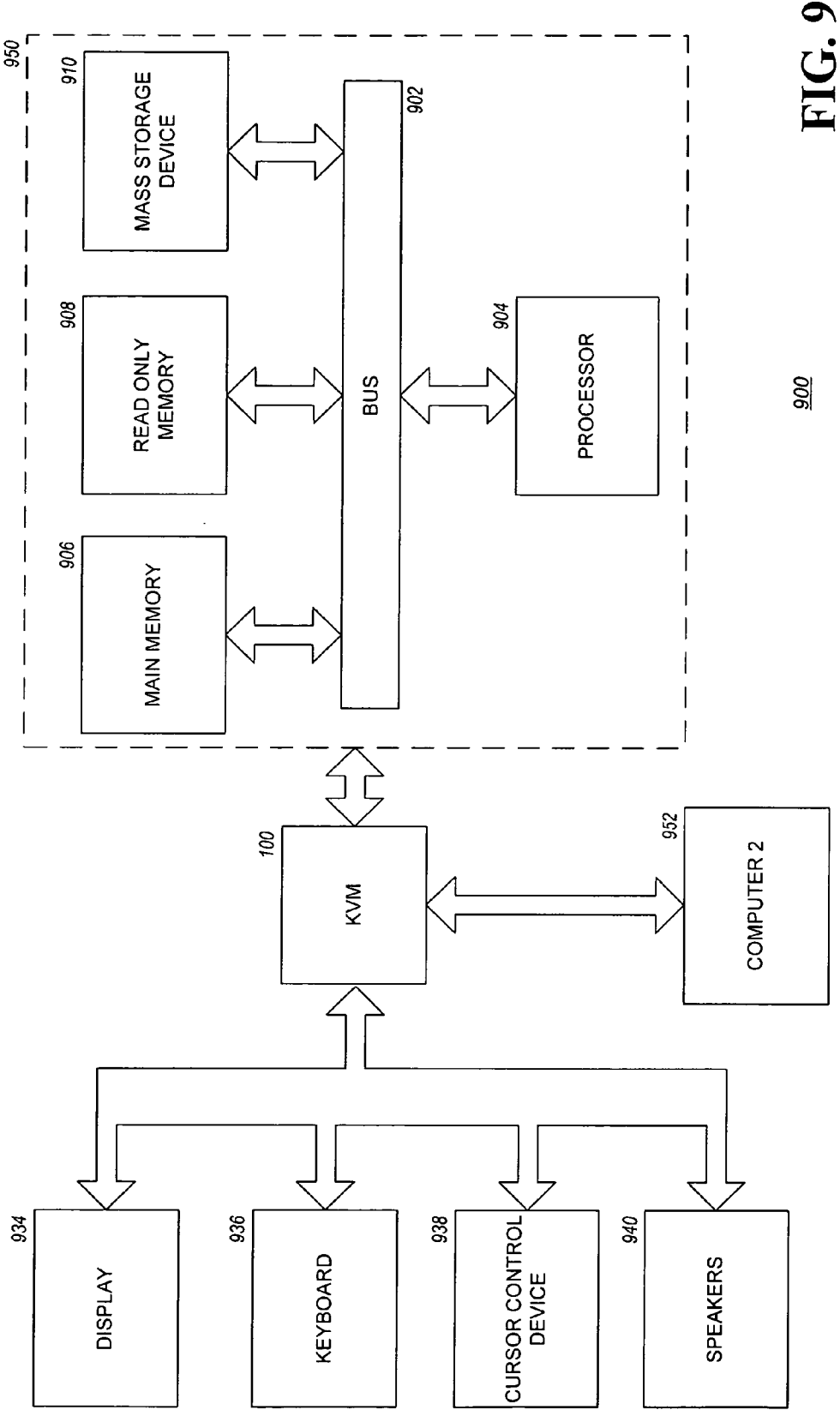
FIG. 9 is a block diagram of a system in which the KVM switch may be used, configured in accordance with one preferred embodiment of the present invention.

FIG. 9 illustrates an example of a system 900 in which the features of the present invention may be implemented. System 900 includes a first computer system 950 and a second computer system 952 that are selectively and switchedly connected to the computer peripherals that are coupled to KVM switch device 100. First computer system 950 and second computer system 952 are general purpose computer systems, as further described below. The following description, although specifically referring to first computer system 950, is applicable to second computer system 952.

First computer system 950 includes a bus 902 for communicating information between the components in first computer system 950, and a processor 904 coupled with bus 902 for executing software code, or instructions, and processing information. First computer system 950 further comprises a main memory 906, which may be implemented using random access memory (RAM) and/or other random memory storage device, coupled to bus 902 for storing information and instructions to be executed by processor 904. Main memory 906 also may be used for storing temporary variables or other intermediate information during execution of instructions by processor 904. First computer system 950 also includes a read only memory (ROM) 908 and/or other static storage device coupled to bus 902 for storing static information and instructions for processor 904. Further, a mass storage device 910, such as a magnetic disk drive and/or or a optical disk drive, may be coupled to first computer system 950 for storing information and instructions. Although not illustrated, first computer system 950 may optionally include video capture/output cards, camera devices, and many other conventional options.

In the configuration shown in FIG. 9, KVM switch device 100 is used to allow a single set of peripherals, e.g., a display device 934, an alphanumeric input device 936, a cursor control device 938 and speakers 940 to be selectively coupled to first computer system 950 or second computer system 952. The computer systems may be connected to any of the outputs 104A to 104D of KVM switch device 100 using first cable 110A, second cable 110B or, as noted above, additional cables connected to first cable connector 152C and second cable connector 152D. Up to four computer systems may be connected to KVM switch device 100 if all four outputs 104A to 104D are used, with one computer system attached to each output.

In one exemplary configuration, first computer system 950 is coupled to display device 934 using video plug 124A on first cable 110A of KVM switch device 100. Display device 934 is a device, such as a cathode ray tube (CRT) or a liquid crystal display (LCD), used for displaying information to a user so that, for example, graphical or textual information may be presented to the user. An alphanumeric input device 936, including alphanumeric and other keys, is coupled to one of the ports of pair of peripheral ports 312 on KVM switch device 100 for communicating information and/or user selection commands to processor 904 of first computer system 950. In one preferred embodiment, is the peripheral standard that is being used is based on the USB standard, as discussed above, then either one of the ports of pair of peripheral ports 312 may be used. First computer 950 is then coupled to KVM switch device 100 using peripheral plug 126 on first cable 110A.

Another type of user input device shown in the figure is a cursor control device 938, such as a conventional mouse, touch mouse, trackball, touchpad or other type of cursor direction keys for communicating direction information and command selection to first computer system 950 and for controlling movement of a cursor on display 934. Similar to alphanumeric input device 936, cursor control device 938 may be plugged into one of the ports of pair of peripheral ports 312 on KVM switch device 100. First computer system 950, which is already coupled to KVM switch device 100 using peripheral plug 126 on first cable 110A, will receive the direction information and command selection generated by cursor control device 938. Various other types of input devices, including, but not limited to the input devices described herein, unless otherwise noted, may be coupled to KVM switch device 100 using pair of peripheral ports 312 to allow the user to provide command or input to first computer system 950.

In one preferred embodiment, if more than two devices are to be coupled to KVM switch device 100, one or more hubs (e.g., one or more USB hubs) may be connected to pair of peripheral ports 312. Thus, more than two computer peripheral devices may be coupled to KVM switch device 100. Specifically, in addition to alphanumeric input device 936 and cursor control device 938, other devices such as printers, image scanners, cameras and microphones may be coupled to KVM switch device 100 through the use of devices such as hubs.

Also as illustrated, speakers 940 are coupled to first computer system 950 via KVM switch device 100. In one preferred embodiment, speakers 940 are first coupled to audio port 316 of KVM switch device 100. Audio plug 122A of first cable 110A is then plugged into first computer system 950.

First computer system 950 may also include a communication device (not shown) that is coupled to bus 902 for accessing other computer systems, as described below. The communication device may include a modem, a network interface card, or other well-known interface devices, such as those used for interfacing with Ethernet, Token-ring, or other types of networks. In any event, in this manner, first computer system 950 may be coupled to a number of other computer systems via a network infrastructure, such as second computer system 952.

The embodiments described above are exemplary embodiments. Those skilled in the art may now make numerous uses of, and departures from, the above-described embodiments without departing from the inventive concepts disclosed herein. Various modifications to these embodiments may be readily apparent to those skilled in the art, and the generic principles defined herein may be applied to other embodiments, e.g., in an instant messaging service or any general wireless data communication applications, without departing from the spirit or scope of the novel aspects described herein. Thus, the scope of the invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments. Accordingly, the present invention is to be defined solely by the scope of the following claims.

What is claimed is:

1. A keyboard, video and mouse (KVM) switch comprising:
an enclosure;
a switching circuit contained within the enclosure;
a set of connector ports disposed on the enclosure and electrically coupled to the switching circuit; and,
a plurality of cables integrated into the enclosure and electrically coupled to the switching circuit, each cable in the plurality of cables including a plurality of connector plugs, wherein each connector plug in the plurality of connector plugs for at least one of the cables in the plurality of cables are matched to at least another one of the respective plurality of connector plugs from another one of the cables in the plurality of cables, and wherein the switching circuit operatively switches the set of connector ports to connect to one of the plurality of cables.

2. The KVM switch of claim 1, further comprising a cable connector disposed on the enclosure and electrically coupled to the switching circuit, wherein the switching circuit also switches to operatively couple each connector port of the set of connector ports to one of the plurality of cables and the cable connector.

3. The KVM switch of claim 1, wherein the plurality of connector plugs comprises a video plug.

4. The KVM switch of claim 1, wherein the set of connector ports comprises a video port.

5. The KVM switch of claim 1, wherein the plurality of connector plugs comprises an USB plug.

6. The KVM switch of claim 1, wherein the set of connector ports comprises an USB port.

7. The KVM switch of claim 1, wherein the enclosure includes an anti-slipping layer.

8. The KVM switch of claim 1, wherein the plurality of cables are fixedly attached to the enclosure through a molded attachment element.

9. The KVM switch of claim 1, wherein the plurality of cables includes a first computer cable for coupling the switching circuit to a first computer.

10. The KVM switch of claim 9, wherein the first computer cable comprises: a computer peripherals cable including a computer peripheral plug;; and, a video cable including a display connector plug.

11. The KVM switch of claim 10, wherein the computer peripheral plug is an USB plug.

12. The KVM switch of claim 9, wherein the plurality of cables includes a second computer cable for coupling the switching circuit to a second computer.

13. A computer peripherals switch comprising:
- a switching circuit contained within a body;
- a first computer cable electrically coupled to the switching circuit and integrally attached to the body;
- a second computer cable electrically coupled to the switching circuit and integrally attached to the body; and,
- a plurality of computer peripheral ports electrically coupled to the switching circuit and disposed on the body; wherein the first computer cable has a plurality of first computer connectors, each of which is matched to at least one of the ports in the plurality of computer peripheral ports, and wherein the switching circuit selectively couples the plurality of first computer connectors to the plurality of computer peripheral ports.

14. The computer peripherals switch of claim 13, wherein the second computer cable has a plurality of second computer connectors, each of which is matched to at least one of the ports in the plurality of computer peripheral ports, and wherein the switching circuit selectively couples the plurality of second computer connectors to the plurality of computer peripheral ports.

15. The computer peripherals switch of claim 13, wherein the first computer cable comprises a computer peripherals cable and the plurality of first computer connectors comprising a computer peripheral connector.

16. The computer peripherals switch of claim 15, wherein the computer peripheral connector is an USB connector.

17. The computer peripherals switch of claim 13, wherein the first computer cable comprises a video cable and the plurality of first computer connectors comprising a video display connector.

18. A method for switching a set of computer peripherals between a first computer and a second computer comprising:
   providing a computer peripherals switch comprising:
   - a body;
   - a switching circuit contained within the body;
   - a first computer cable electrically coupled to the switching circuit and integrally attached to the body;
   - a second computer cable electrically coupled to the switching circuit and integrally attached to the body; and,
   - a plurality of computer peripheral ports electrically coupled to the switching circuit and disposed on the body; wherein the first computer cable has a plurality of first computer connectors, each of which is matched to at least one of the ports in the plurality of computer peripheral ports;
   connecting the first computer cable to the first computer;
   connecting at least one computer peripheral from the set of computer peripherals to the plurality of computer peripheral ports; and,
   operating the switching circuit to couple the at least one computer peripheral to the first computer.

19. The method of claim 18, wherein the second computer cable has a plurality of second computer connectors, each of which is matched to at least one of the ports in the plurality of computer peripheral ports, and wherein the method further comprising: connecting the second computer cable to the second computer; and, operating the switching circuit to couple the at least one computer peripheral to the second computer.

20. The method of claim 18, wherein the first computer cable comprises a computer peripherals cable and the plurality of first computer connectors comprising a computer peripheral connector.

* * * * *